(12) United States Patent
Meade et al.

(10) Patent No.: US 8,384,896 B2
(45) Date of Patent: Feb. 26, 2013

(54) OPTICAL SLICER FOR IMPROVING THE SPECTRAL RESOLUTION OF A DISPERSIVE SPECTROGRAPH

(75) Inventors: Jeffrey T. Meade, Arden (CA); Arsen R. Hajian, Waterloo (CA); Bradford B. Behr, Silver Spring, MD (US); Andrew T. Cenko, Waterloo (CA)

(73) Assignee: Tornado Medical Systems, Inc., Toronto, ON (CA)

( * ) Notice: Subject to any disclaimer, the term of this patent is extended or adjusted under 35 U.S.C. 154(b) by 199 days.

(21) Appl. No.: 12/896,604

(22) Filed: Oct. 1, 2010

(65) Prior Publication Data
US 2011/0299075 A1 Dec. 8, 2011

Related U.S. Application Data

(60) Provisional application No. 61/247,762, filed on Oct. 1, 2009, provisional application No. 61/350,264, filed on Jun. 1, 2010.

(51) Int. Cl.
G01J 3/28 (2006.01)
G01J 3/00 (2006.01)
G02B 27/10 (2006.01)
G02B 7/182 (2006.01)
G02B 5/08 (2006.01)
G02B 5/10 (2006.01)

(52) U.S. Cl. ........ 356/326; 356/300; 359/627; 359/856; 359/857; 359/858; 359/864

(58) Field of Classification Search ............... 356/213, 356/302; 359/362, 365, 366, 627, 856–858, 359/862–865
See application file for complete search history.

(56) References Cited

U.S. PATENT DOCUMENTS

| 3,510,203 | A | | 5/1970 | Richardson | |
| 4,678,332 | A | * | 7/1987 | Rock et al. | 356/328 |
| 7,190,451 | B2 | * | 3/2007 | Seyfried et al. | 356/326 |
| 7,929,140 | B2 | * | 4/2011 | Zambuto et al. | 356/440 |
| 8,174,694 | B2 | * | 5/2012 | Bodkin | 356/328 |
| 2007/0075058 | A1 | * | 4/2007 | Ehrmann et al. | 219/121.69 |
| 2007/0201022 | A1 | * | 8/2007 | Neiss et al. | 356/300 |
| 2009/0221920 | A1 | | 9/2009 | Boppart et al. | |

FOREIGN PATENT DOCUMENTS

CA 2443494 3/2005
WO WO 2005/010597 2/2005

OTHER PUBLICATIONS

Bowen, Dr. I.S., "The Image-Slicer, A Device for Reducing Loss of Light a Slit of Stellar Spectrograph", Astrophysical Journal, 1938, vol. 88, p. 113.
Cardona et al., "Star Image Shape Transformer for Astronomical Slit Spectroscopy", Revista Mexicana de Astronomia y Astrofisica, 2010, vol. 46, pp. 431-438.
Written Opinion of the International Search Authority with respect to International Application No. PCT/CA2010/001606 dated Jan. 20, 2011.
International Search Report with respect to International Application No. PCT/CA2010/001606 dated Jan. 21, 2011.

* cited by examiner

*Primary Examiner* — Gregory J Toatley
*Assistant Examiner* — Hina F Ayub

(57) ABSTRACT

An optical slicer for generating an output spot comprising an image compressor which receives a substantially collimated input beam and compresses the beam, wherein the input beam, if passed through a focusing lens, produces an input spot; an image reformatter which receives the compressed beam to reformat the beam into a plurality of sliced portions of the compressed beam and vertically stacks the portions substantially parallel to each other; and an image expander which expands the reformatted beam to produce a collimated output beam which, if passed through the focusing lens, produces the output spot that is expanded in a first dimension and compressed in a second dimension relative to the input spot.

17 Claims, 18 Drawing Sheets

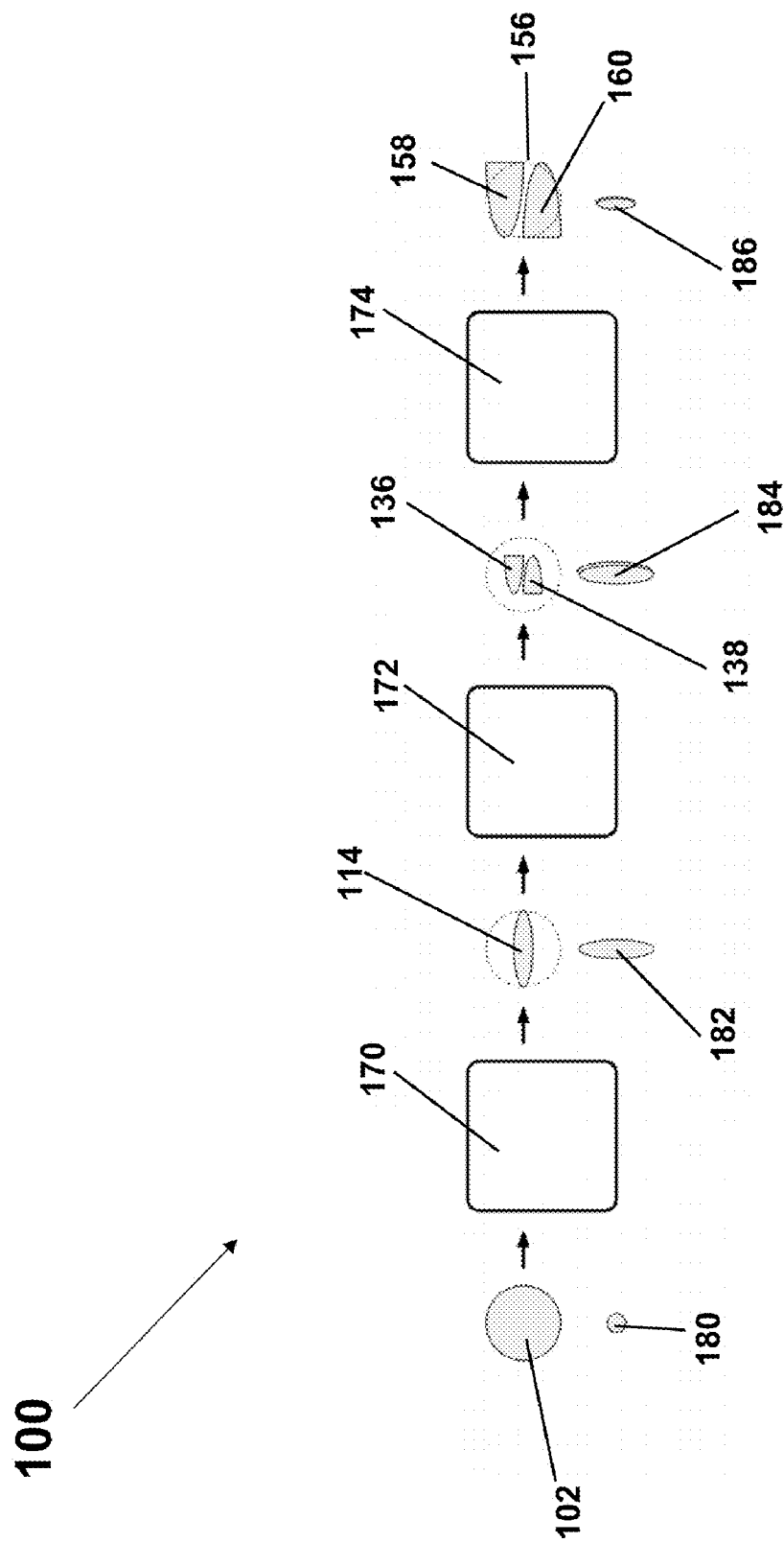

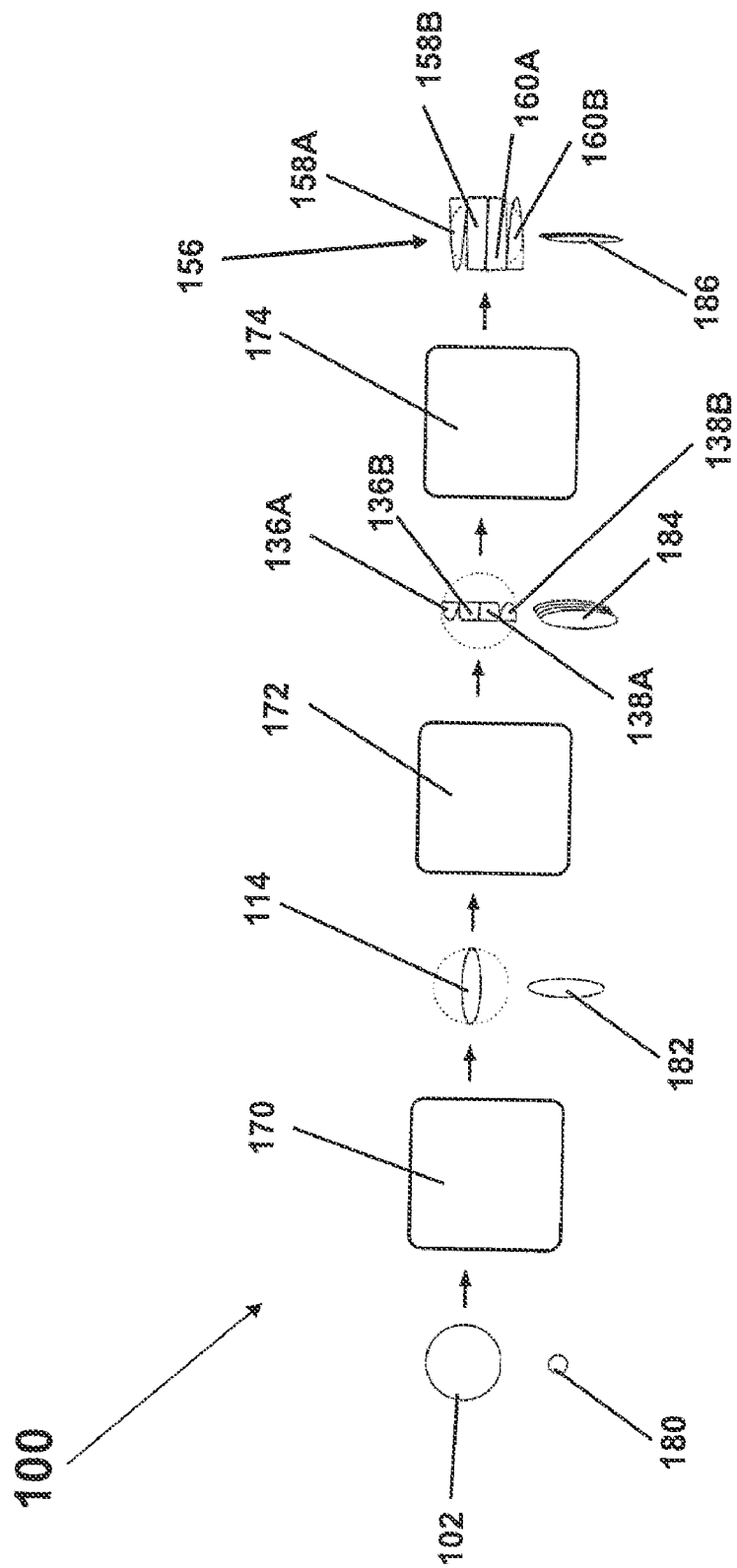

OPTICAL SLICER FOR IMPROVING THE SPECTRAL RESOLUTION OF A DISPERSIVE SPECTROGRAPH

RELATED APPLICATIONS

This application claims priority from U.S. Provisional Application No. 61/247,762 filed Oct. 1, 2009 and U.S. Provisional Application No. 61/350,264 filed Jun. 1, 2010, the contents of each of which are herein incorporated by reference.

FIELD OF INVENTION

This invention relates to the field of spectroscopy and more specifically relates to improved apparatus and methods for improving spectral resolution.

BACKGROUND

A typical optical spectrograph includes a small input aperture, typically a slit, however, can alternatively be a circular pinhole or an optical fiber; however, for the sake of brevity, will hereinafter be referred to as a slit. A converging cone of light, is projected towards the slit and a portion of the light passes through the slit. In a typical optical spectrograph, this slit of light is projected onto a lens which collimates the slit of light to form a beam of parallel light rays. In a typical optical spectrograph, a dispersive element, such as, a prism, a transmission grating, or reflection grating, bends the collimated beams by differing amounts, depending on the wavelength of the light. Typically, a camera lens brings these bent collimated beams into focus onto an array detector, such as, a charged-coupled device (CCD) detector located at the final focal plane, and which may record the light intensities of the various wavelengths.

In a typical optical spectrograph, the collimating lens and the camera lens act as an image relay, to create images of the light passing through the slit on the detector, such as a CCD detector, which may be displaced laterally depending on the wavelength of the light. The resolution of an optical spectrograph, i.e., its ability to detect and measure narrow spectral features such as absorption or emission lines, can be dependent upon various characteristics. Such characteristics may include the dispersing element, such as, the prism, transmission grating, or reflection grating; the focal length of the camera lens; and the width of the slit. For a particular disperser and camera lens, the resolution of the spectrograph can be increased by narrowing the width of the input slit, which causes each image of the light passing through the slit (depending on the wavelength of the light) and onto a detector, subtending a smaller section of the detector, allowing adjacent spectral elements to be more easily distinguished from each other.

By narrowing the width of the input slit, less light passes therethrough, which can reduce the quality of any measurements due to a reduction in the signal-to-noise ratio. In some applications, such as astronomical spectroscopy, high-speed biomedical spectroscopy, high-resolution spectroscopy, or Raman spectroscopy, this loss of efficiency can be a limiting factor in the performance of the optical spectrograph. A device which increases the amount of light that can pass through the slit by horizontally compressing and vertically expanding a spot image of an input beam of light, producing a slit, while substantially maintaining light intensity or flux density, would be advantageous in the field of optical spectrography.

A person of skill will understand that the terms horizontal, vertical and other such terms used throughout this description, such as, above and below, are used for the sake of explaining various embodiments of the invention, and that such terms are not intended to be limiting of the present invention.

Optical slicers can be useful to receive an input beam and produce output beams for generating slits. The use of transparent prisms and plates to slice an input beam can produce a slit that is tilted along the optical axis, and additionally the slicing of an optical beam can occur along the hypotenuse of a 45° prism, which can result in focal point degradation due to different sections of the sliced image being located at different focal positions. The performance of such slicers can depend on the absorption coefficient and index of refraction of the prism used (both wavelength dependent). These deficiencies can limit the use of such slicers as broadband devices.

Other slicers, such as pupil slicers, possess drawbacks such as the inability to obtain high-resolution spectral information from different portions of an image. Additionally, such slicers can be large in size, and can result in reduced or inefficient implementation with a variety of systems. Current slicers that employ a glass-based design tend to use a Lagrange-constant transformer to bring light from a Raman optical source to an optical spectrometer. The transformer involves eight different cylindrical and spherical lenses, as well as two stacks of ten precisely positioned cylindrical lenses. The resulting device can have a length of more than 58 inches along the main optical axis, a size at which it tends to be both difficult to maintain alignment, and difficult to maneuver or employ in any setting outside of a tightly-controlled laboratory.

In some pupil slicers, two slit images can be generated on different portions of a CCD detector. This implementation can present the disadvantage that the slit images are spaced on the detector with gaps in between, which can add noise to the signal, decreasing the quality of the output data. Additionally, in such slicers, the gaps can waste valuable detector area, limiting the number of spectra (or spectral orders) that can be fit upon the detector. Further, when using such slicers, the detector readout may not be optimal due to the spectrum being spread over the detector area.

Slicers using optical fiber bundles to allow the extended (often round) image of an input source to be formed into a narrow slit can cause the degradation of the output ratio to be large and the total performance to be inefficient. Existing slicer devices uniformly suffer this decreased efficiency and output ratio, representing a clearly-defined objective of slicer design and implementation.

SUMMARY OF THE INVENTION

In an aspect of the present invention there is provided an optical slicer for generating an output spot comprising an image compressor which receives a substantially collimated input beam and compresses the beam, wherein the input beam, if passed through a focusing lens, produces an input spot; an image reformatter which receives the compressed beam to reformat the beam into a plurality of sliced portions of the compressed beam and vertically stacks the portions substantially parallel to each other; and an image expander which expands the reformatted beam to produce a collimated output beam which, if passed through the focusing lens, produces an output spot that is expanded in a first dimension, and compressed in a second dimension, relative to the input spot.

In some embodiments of the present invention, the compressed beam may be compressed vertically and be substantially similar horizontally relative to the input beam and the output beam may be expanded horizontally relative to the reformatted beam and may have substantially similar dimensions to the input beam.

In other embodiments, the optical slicer may have a slicing factor, n. The number of sliced portions of the compressed beam may be equal to n and the output beam may be expanded vertically by the factor n and compressed horizontally by the factor n, relative to the input spot.

The compressor may have a convex lens and a concave lens, wherein the convex lens may receive the input beam and may produce a converging beam, and the compressed beam may be formed by the converging beam passing through the collimating lens. In alternative embodiments, the image compressor may have a concave reflective surface and a convex reflective surface and the concave reflective surface may receive the input beam and may produce a converging beam, and the compressed beam may be formed by the converging beam reflecting off the concave reflective surface.

The image reformatter may have at least two reflective surfaces, where one of the reflective surfaces may receive a portion of the compressed beam and may reflect the portion for at least one reflection back and forth between the at least two reflective surfaces, wherein each of the sliced portions may be formed by a second portion of compressed beam passing by the at least two reflective surfaces after each of the at least one reflection.

The image expander may comprise a concave lens and a convex lens, wherein the concave lens may receive the reformatted beam and may produce a diverging beam and the output beam may be produced by the diverging beam passing through the convex lens. In alternative embodiments, the image expander may comprise a convex reflective surface and a concave reflective surface, wherein the convex reflective surface may receive the reformatted beam and may produce a diverging beam and the output beam may be formed by the diverging beam reflecting off the concave reflective surface.

In some embodiments of the present invention, the output spot may have a light intensity value that is substantially the same as the light intensity of the input spot.

In another aspect of the present invention there is provided a method of generating an output spot comprising the steps of compressing a collimated input beam, wherein the input beam, if passed through a focusing lens, produces an input spot; reformatting the compressed beam into a plurality of sliced portions substantially vertically stacked and substantially parallel to each other; and expanding the reformatted beam to produce a collimated output beam which, when passed through a focusing lens, produces the output spot that is expanded in a first dimension, and compressed in a second dimension, relative to the input spot.

In some embodiments, the compressed beam may be compressed vertically and may be substantially similar horizontally relative to the input beam and the output beam may be expanded horizontally relative to the reformatted beam and may have substantially similar dimensions to the input beam.

In some embodiments, the number of sliced portions may be equal to a slicing factor, n, and the output spot may be expanded vertically by the factor n and compressed horizontally by the factor n, relative to the input spot.

In a further aspect of the present invention, an optical slicer having a slicing factor, n, is presented, the optical slicer comprising an image compressor which receives a substantially collimated input beam and compresses the beam, wherein the collimated beam, if passed through a focusing lens, produces an input spot; an image reformatter which receives the compressed beam to reformat the beam into n sliced portions of the compressed beam and vertically stacks the portions substantially parallel to each other; and an image expander which expands the reformatted beam to produce a collimated beam which, when passed through the focusing lens, produces an output spot compressed by the factor n in a first dimension relative to the input spot and expanded by the factor n in a second dimension relative to the input spot.

In another aspect of the present invention a multiplicative optical slicer comprising a first optical slicer having a first slicing factor, m, and a second optical slicer having a second slicing factor, n, the first and second optical slicers being placed in series, and the multiplicative optical slicer having a slicing factor of m×n.

BRIEF DESCRIPTION OF FIGURES

For a better understanding of embodiments of the system and methods described herein, and to show more clearly how they may be carried into effect, reference will be made by way of example, to the accompanying drawings in which:

FIG. 1A shows a block diagram representation of an optical slicer having a slicing factor of two;

FIG. 1B shows a block diagram representation of an optical slicer having a slicing factor of four;

DETAILED DESCRIPTION

Figure 2:
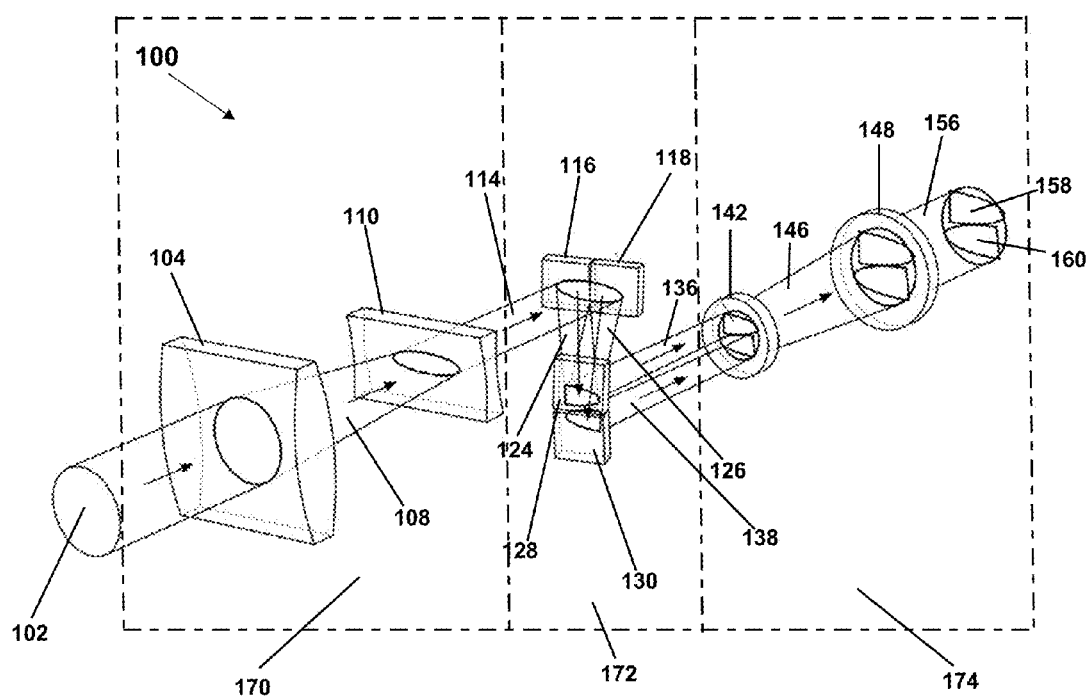
FIG. 2 shows an isometric view of an embodiment of an optical slicer having a slicing factor of two.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures, and components have not been described in detail so as not to obscure the embodiments described herein. Furthermore, this description is not to be considered as limiting the scope of the embodiments described herein in any way, but rather as merely describing the implementation of the various embodiments described herein.

With reference to FIG. 1A, a representation of optical slicer 100 is shown, optical slicer including image compressor 170, image reformatter 172 and image expander 174. Optical slicer 100 receives input beam 102, as a collimated beam, which can be produced, for example by a collimating lens or a curved mirror. Input beam 102 also generates input spot 180 when focused by a focusing lens having substantially the same focal length as the collimating lens or curved mirror used to produce input beam 102.

Image compressor 170 of optical slicer 100 receives input beam 102 and outputs vertically compressed beam 114, anamorphically compressed in the vertical dimension, and having a smaller vertical dimension than and a greater horizontal dimension than that of input beam 102. Additionally, vertically compressed beam 114, if passed through a focusing lens with the same focal length as the collimating lens or curved mirror used to produce input beam 102 produces compressor spot 182, resulting in the focusing of compressed beam 114 to project an image that is substantially similar in the horizontal dimension as compared to input spot 180, while being expanded in the vertical dimension.

In some embodiments, the image projected by vertically compressed beam 114 may have the same horizontal width as input beam 102; however, the vertical height of vertically compressed light 114 may be compressed by the slicing factor. The term "slicing factor" is used to describe the value of the horizontal compression and vertical expansion of the output spot generated by the output beam of an optical slicer as compared to the horizontal and vertical dimensions of the input spot generated by the input beam into the optical slicer, the output and input spots being generated when the output and input beams are each respectively focused by the same focusing lens.

For example, for an optical slicer with a slicing factor of two, such as the optical slicer represented in FIG. 1A, the output slicer produces output beam 156, which, if focused through a focusing lens having a focal length substantially equal to the focal length of the collimating lens or convex mirror that generated input beam 102, causes the generation of output spot 186. Focusing input beam 102 through the same focusing lens will tend to generate input spot 180. Output spot 186 having a vertical dimension that is twice that of input spot 180 and a horizontal dimension that is half that of input spot 180. Thus, the slicing factor of the optical slicer produced by this configuration is two.

In alternative embodiments, such as the representation of optical slicer 100 shown in FIG. 1B, output spot 186 can similarly be generated by focusing output beam 156 through a focusing lens having a focal length substantially equal to the focal length of the collimating lens or convex mirror that generated input beam 102. Focusing input beam 102 through the same focusing lens generates input spot 180. In this embodiment, output spot 186 has a vertical dimension that is four times that of input spot 180 and has a horizontal dimension that is ¼ that of input spot 180, thus, the slicing factor of optical slicer 100 represented in FIG. 1B is four.

Other values of the slicing factor n are possible. The output spot generated by the output beam in a substantially similar manner as discussed above, may have a vertical dimension that is n times larger than the vertical dimension of the input spot generated by the input beam and may tend to have a horizontal dimension that is 1/n of the horizontal dimension of the input spot.

Referring back to FIG. 1A, vertically compressed beam 114 is received by image reformatter 172 which outputs reformatted beams 136 and 138; such reformatted formatted beams 136 and 138 being substantially vertically stacked and substantially parallel. Reformatted beams 136 and 138 are sliced portions of vertically compressed beam 114. In the embodiment shown, image reformatter 172 outputs two beam slices, which, in this embodiment, is equal to the slicing factor of optical slicer 100; however, in some embodiments, image reformatter 172 may produce a number of slices that is greater than or less than the slicing factor of optical slicer 100.

Each of reformatted beams 136 and 138, if passed through a focusing lens having the same focal length as the collimating lens or curved mirror used to produce input beam 102, produces reformatter spot 184. Reformatter spot 184 is substantially the same dimension both horizontally and vertically, as compressor spot 182. Since reformatted beams 136 and 138 are substantially vertically stacked and substantially parallel, the individual reformatter spots generated by each of reformatted beams 136 and 138, combined to form reformatter spot 184, are projected atop one another, so as to double the light intensity of reformatter spot 184 as compared to the individual reformatter spots generated from each of beams 136 and 138 individually.

While the light intensity of reformatter spot 184 in the embodiment shown in FIG. 1A is double, as compared to the light intensity of each individual reformatter spot generated by each reformatted beam, in other embodiments, the light intensity of reformatter spot 184, as compared to the light intensity of each individual reformatter spot generated by each reformatted beam, corresponds to the number of sliced portions generated by image reformatter 174. For example, with reference to FIG. 1B, optical slicer 100 is shown having image reformatter 172 that produces reformatted beams 136A, 136B, 138A and 138B, each of the reformatted beams being substantially parallel and substantially vertically stacked. Reformatted beams 136A, 136B, 138A and 138B are sliced portions of vertically compressed beam 114. Reformatter spot 184, generated by reformatted beams 136A, 136B, 138A and 138B in a substantially similar manner as discussed above, has about four times the light intensity of each individual reformatter spot generated from each reformatted beam 136A, 136B, 138A and 138B.

With reference back to FIG. 1A, reformatted beams 136 and 138 are received by image expander 174 which expands reformatted beams 136 and 138 by a factor of the slicing factor. In the embodiment shown, the reformatted beams 136 and 138 are expanded by a factor of two, in both the horizontal and vertical directions (non-anamorphically), to produce output beam 156, output beam 156 which is made up of sliced beams 158 and 160. Sliced beams 158 and 160 are expansions of reformatted beams 136 and 138. Output beam 156 has substantially similar dimensions to that of input beam 102. Projecting output beam 156 onto a lens, such lens having substantially the same focal length as the collimating lens or curved mirror used to produce input beam 102, focuses output beam 156 to produce output spot 186. Output spot 186 produces an image of input spot 180 that can be compressed in the horizontal direction by the slicing factor and stretched in the vertical direction by the slicing factor while maintaining a similar light intensity as input spot 180. In embodiments, such as the embodiment represented in FIG. 1A, output spot 186 can be two times larger in the vertical direction as input spot 180 and can be compressed by two times in the horizontal direction as input spot 180.

In other embodiments, such as the embodiment shown in FIG. 1B, reformatted beams 136A, 136B, 138A and 138B are received by image expander 174, which may be an anamorphic horizontal beam expander, to produce output beam 156, made up of output slices 158A, 158B, 160A and 160B, which are expansions of reformatted beams 136A, 136B, 138A and 138B, expanded in the horizontal direction. In some embodiments, output beam 156 has similar dimensions as input beam 102. With respect to the embodiment represented by FIG. 1B, representing an optical slicer having a slicing factor of four, when output beam 156 is projected onto a lens having substantially the same focal length as the collimating lens or curved minor used to produce input beam 102, output beam 156 is focused to produce output spot 186. Output spot 186 can be four times larger in the vertical direction as input spot 180 and can be compressed by four times in the horizontal direction as input spot 180, while maintaining a similar light intensity as input spot 180.

It will be understood by those skilled in the art that the resulting output beam 156 of optical slicer 100, where optical slicer 100 has a slicing factor of n, when focused by a focusing lens having substantially the same focal length as the collimating lens or curved minor used to produce input beam 102, produces an output spot that is n times larger in the vertical direction and compressed by n times in the horizontal direction, as compared to the input spot generated by input beam 102 passing through the same focusing lens, while maintaining a similar light intensity as the input spot.

With reference to FIG. 2, optical slicer 100 is shown, including image compressor 170, image reformatter 172 and image expander 174. In FIG. 2, optical slicer 100 has a slicing factor of two. Input beam 102 can be a substantially collimated beam, which can be produced by a collimating lens or a curved minor. Input beam 102 generating an input spot when focused by a focusing lens having the same focal length as the collimating lens or curved minor used to produce input beam 102.

Input beam 102 is received by image compressor 170 which outputs vertically compressed beam 114. Image compressor 170 has convex cylindrical lens 104 which receives input beam 102 and outputs vertically converging beam 108. Vertically converging beam 108 is received by concave cylindrical lens 110 which collimates vertically converging beam 108 and outputs vertically compressed beam 114. In other embodiments, a pairing of multiple convex lenses can output vertically compressed beam 114. In such alternative embodiments lens 104 can be a convex lens and lens 108 can be a convex lens.

Additionally, vertically compressed beam 114, if passed through a focusing lens with the same focal length as the collimating lens or curved mirror used to product input beam 102 produces a compressor spot having a substantially similar dimension in the horizontal direction and expanded in the vertical direction by a factor of the slicing factor as compared to the input spot generated by passing input beam 102 through the same focusing lens. In the embodiment shown, the slicing factor is two, when compared to the input spot generated by input beam 102 using the same focusing lens.

Figures 6A, 6B, 6C, 6D:
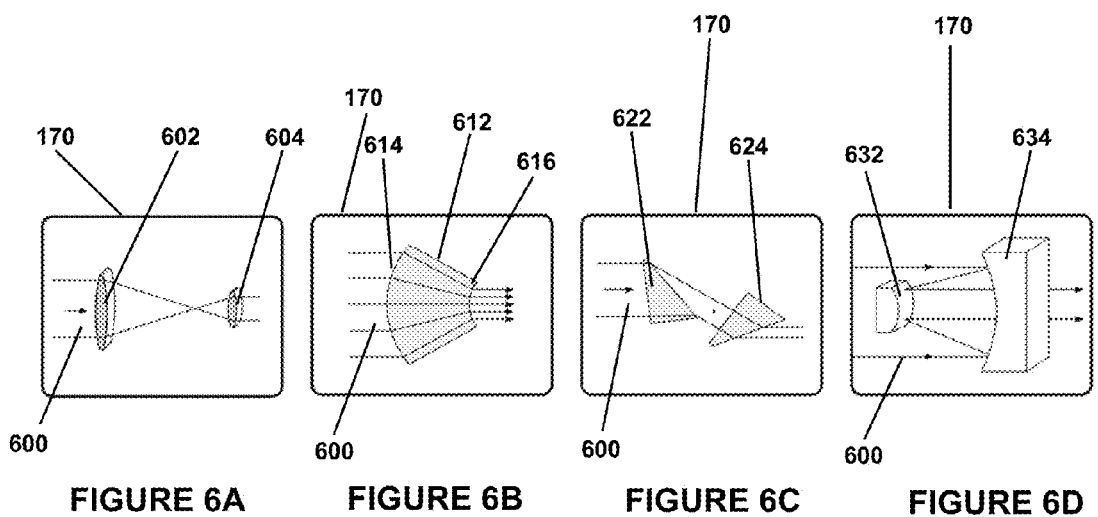
FIGS. 6A-6D show representations of alternative embodiments of compressors for use in an embodiment of an optical slicer.

With reference to FIGS. 6A-6D, alternative embodiments of image compressor 170 are shown. Referring to FIG. 6A, image compressor 170 has cylindrical lens 602 which receives compressor input beam 600 and focuses compressor input beam 600 for subsequent projection onto collimating cylindrical lens 604 to produce an output beam that is compressed relative to compressor input beam 600. In the embodiment shown in FIG. 6A, collimating cylindrical lens 604 is positioned beyond the focal point of cylindrical lens 602, collimating cylindrical lens 604 outputting an inverted image of compressor input beam 600 that is compressed vertically.

With reference to FIG. 6B, image compressor 170 has an optical element 612 having first surface 614 which focuses compressor input beam 600 in the vertical direction and second surface 616 which substantially collimates the focused beam produced by first surface 614. The beam output from optical element 612 produces an output beam compressed vertically when compared with compressor input 600.

With reference to FIG. 6C, image compressor 170 has anamorphic prisms 622 and 624, oriented such that compressor input beam 600 is refracted at the output face of each of anamorphic prisms 622 and 624. The resulting output beam of image compressor 170 in this embodiment produces an output beam compressed vertically when compared with compressor input beam 600.

With reference to FIG. 6D, image compressor 170 has mirrors 632 and 634, compressor input beam 600 reflecting off concave surface of mirror 634 and projecting onto convex surface of minor 632, to produce an output beam compressed vertically when compared with compressor input beam 600.

Skilled persons will understand that obvious variants of the compressors described herein, and obvious orientations of such compressors elements may be implemented to produce a beam that is compressed vertically as compared to compressor input beam 600.

With reference back to FIG. 2, vertically compressed beam 114 is received by image reformatter 172 which outputs reformatted beams 136 and 138, such reformatted beams 136 and 138 being substantially parallel and substantially vertically stacked. Image reformatter 172 includes side-by-side flat mirrors 116 and 118 and vertically stacked flat mirrors 128 and 130.

Side-by-side flat minors 116 and 118 can receive vertically compressed beam 114, a portion of vertically compressed beam 114 being received by side-by-side flat mirror 116 and another portion of vertically compressed beam 114 being received by side-by-side flat mirror 118, which slices vertically compressed beam 114 producing sliced beams 124 and 126. Sliced beams 124 and 126 are reflected from side-by-side flat minors 116 and 118 onto vertically stacked minors 128 and 130, sliced beam 124 being reflected onto vertically stacked mirror 128 and sliced beam 126 being reflected onto vertically stacked mirror 130.

Sliced beams 124 and 126 are reflected off vertically stacked mirrors 128 and 130 to produce reformatted beams 136 and 138. Reformatted beams 136 and 138 are similar to sliced beams 124 and 126 but are substantially vertically stacked and substantially parallel. In some embodiments, vertically stacked minors 128 and 130 are D-shaped minors and can be optically flat and fully aluminized, or mirrorized, to within 50 μm of their adjacent edges; however, a skilled person will understand that other reflective properties may achieve substantially similar results.

If reformatted beams 136 and 138 are passed through a focusing lens with the same focal length as the collimating lens or curved minor used to produce input beam 102, a reformatter spot is produced. In the embodiment shown, this reformatter spot has the same horizontal dimension and a vertical dimension which is four times that of the input spot formed by passing input beam 102 through the same focusing lens, while maintaining a similar light intensity as the input spot.

Figure 7A:
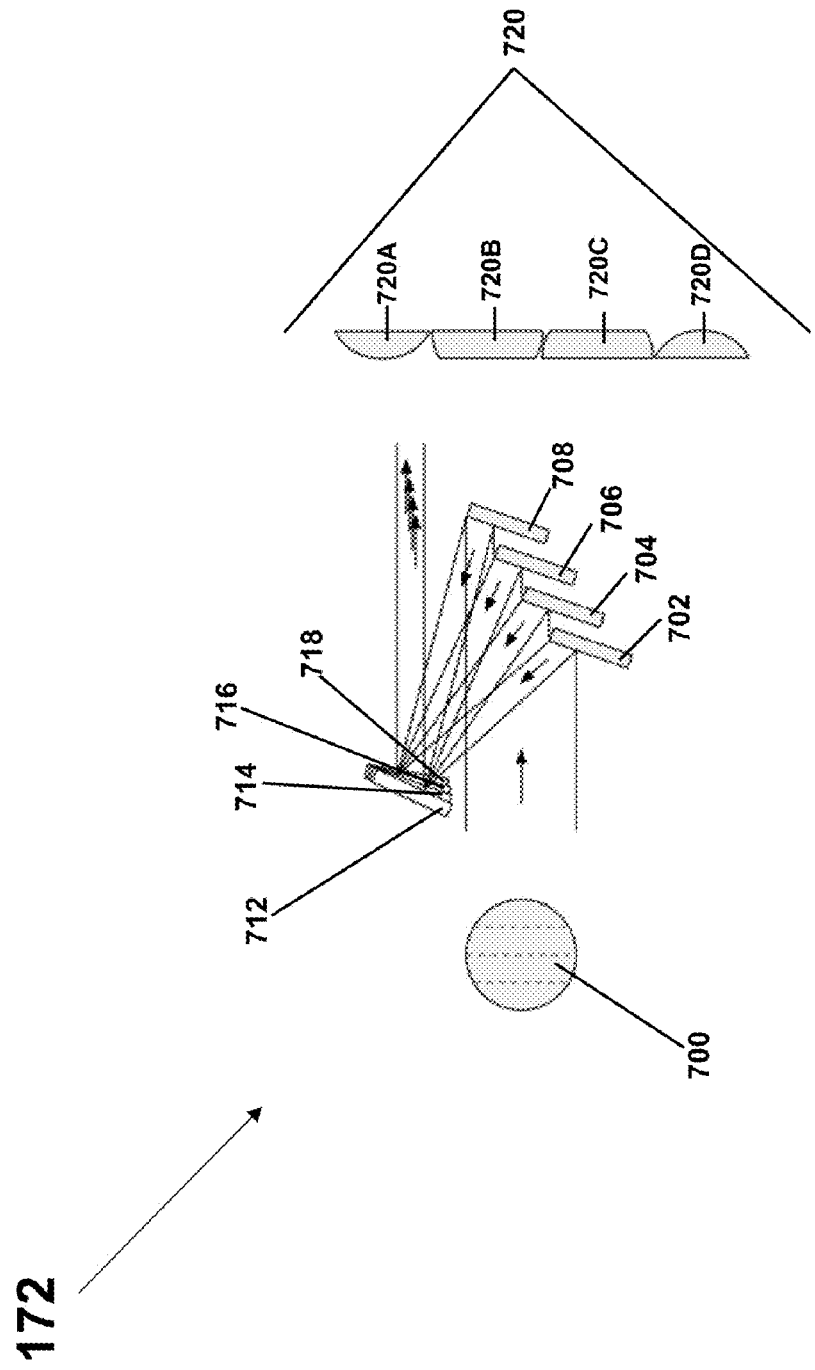
FIGS. 7A-7C show representations of alternative embodiments of reformatters having a slicing factor of four for use in an embodiment of an optical slicer.
Figure 7B:
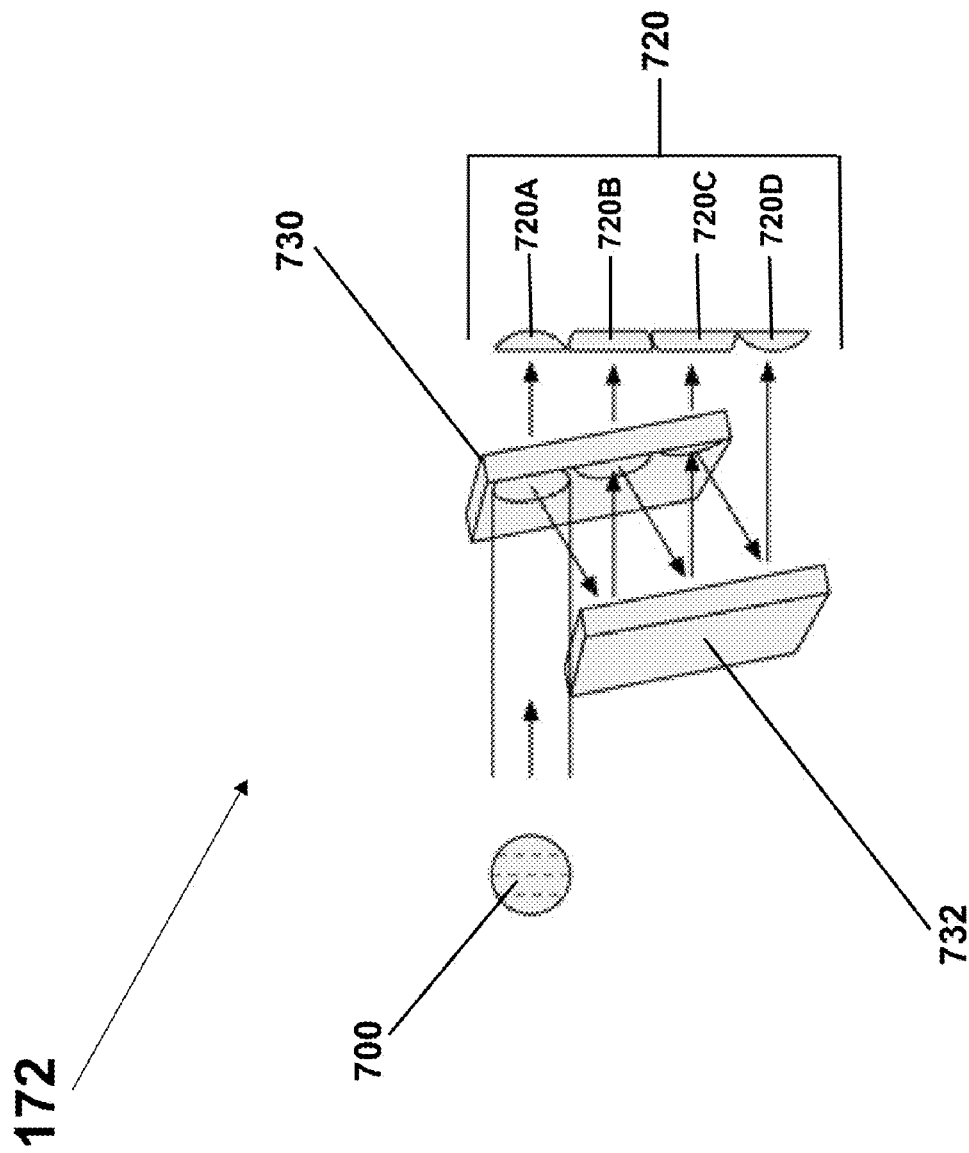
Figure 7C:
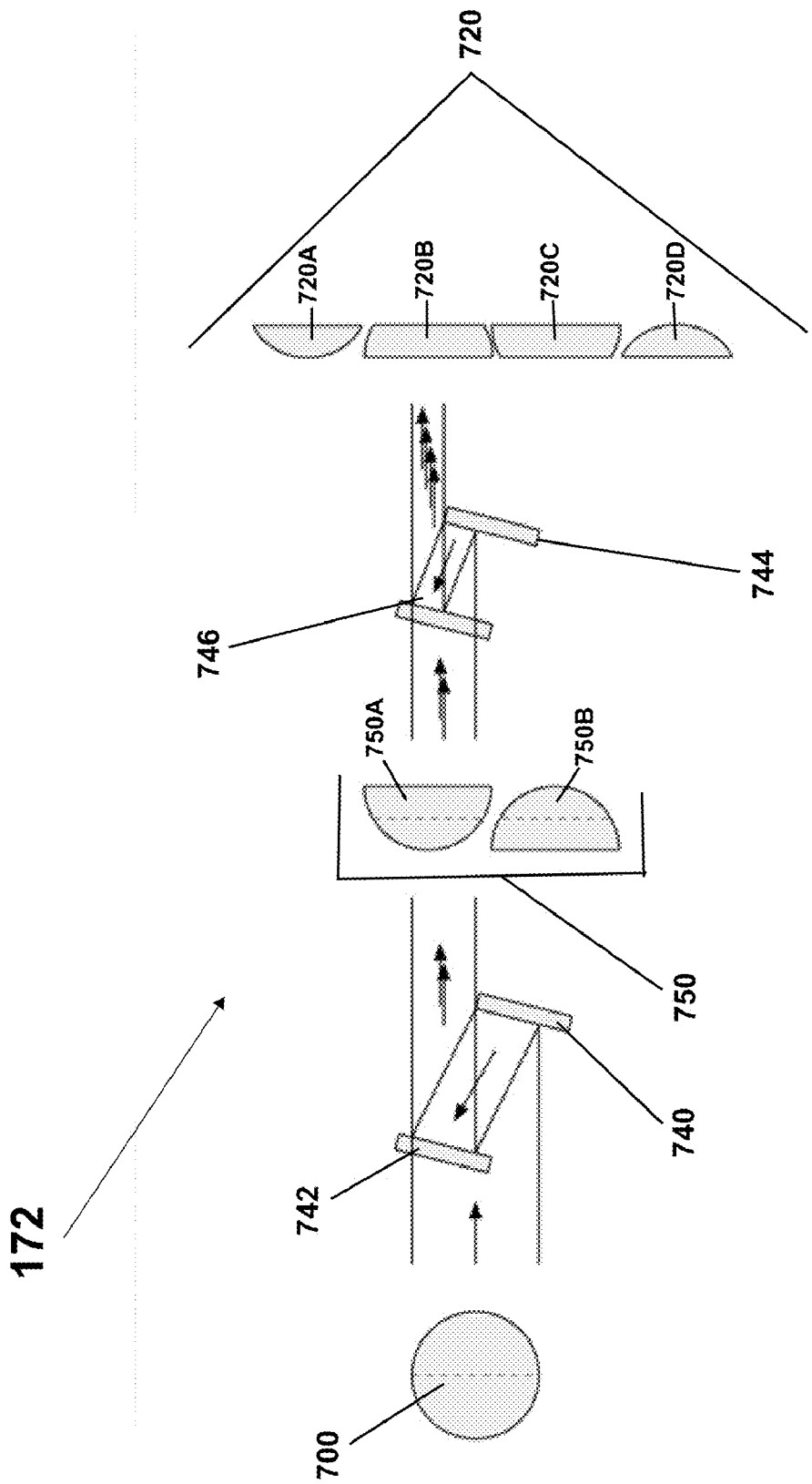

With reference to FIGS. 7A-7C, alternative embodiments of image reformatter 172 are shown. Referring to FIG. 7A, image reformatter 172 has multiple pairs of mirrors each to receive a portion of reformatter input beam 700 and each positioned to produce a portion of reformatted beam 720, reformatted beam 720 being made up of beam portions 720A, 720B, 720C and 720D, each beam portion being substantially parallel and substantially vertically stacked and being a sliced portion in reformatter input beam 700. Minor pairs 702 and 712 can receive a first portion of reformatter input beam 700, the first portion reflecting off minor 702 and received by mirror 712, mirror 712 being aligned to produce beam portion 720D. Mirror pairs 704 and 714 receive a second portion of reformatter input beam 700, the second portion reflecting off mirror 704 and received by mirror 714, mirror 714 being aligned to produce beam portion 720C. Mirror pairs 706 and 716 receive a third portion of reformatter input beam 700, the third portion reflecting off mirror 706 and received by mirror 716, mirror 716 being aligned to produce beam portion 720B. Mirror pairs 708 and 718 receive a fourth portion of reformatter input beam 700, the fourth portion reflecting off mirror 708 and received by mirror 718, mirror 718 being aligned to produce beam portion 720A. A skilled person will appreciate that the addition of additional mirror pairs can increase the number of beam portions of reformatted beam 720.

Referring to FIG. 7B, image reformatter 172 includes reflective surfaces 730 and 732. When in use, reformatter input 700 is received by reflective surface 730 and can be reflected back and forth between reflective surface 732, a portion of the reflected beam being reflected off reflective surface 732 and passing by reflective surface 730 to produce a beam portion of output beam 720 until each of beam portions 720A, 720B, 720C and 720D are generated, each beam portion being substantially parallel and substantially vertically stacked relative to one another and each being a sliced portion of reformatter input 700. A skilled person will appreciate that additional beam portions may be generated by adjusting the position of reflective surfaces 730 and 732 to produce additional reflections back and forth between reflective surfaces 730 and 732, each of the reflections continuing to provide for a portion of the reflected beam to pass by reflective surface 730 to form a beam portion of output beam 730.

Referring to FIG. 7C, image reformatter 172 may be comprised of two stages, a first stage being comprised of reflective surfaces 740 and 742 and a second stage being comprised of reflective surfaces 744 and 746. A portion of reformatter input 700 passing by reflective surface 740, producing beam portion 750B of first output beam 750, and a second portion of input beam may be reflected off reflective surface 740 onto reflective surface 742 to form beam portion 750A of first output beam 750 which tends to pass by reflective surface 740. Each of beam portions 750A and 750B being substantially parallel and substantially vertically stacked. Beam 750 may then partially be received by reflective surface 744, a portion of beam 750 passing by reflective surface 744 to produce output beams 720C and 720D, the remaining portion of beam 750 being reflected off reflective surface 744 onto reflective surface 746. The reflection of the beam portion off reflective surface 746 producing output beam portions 720A and 720B of output beam 720, which can pass by reflective surface 744. Beam portions 720A, 720B, 720C and 720D being substantially vertically stacked and substantially parallel and being sliced portions of reformatter input 700. A skilled person will appreciate that by adding additional stages, output beam can be made up of additional beam portions. For example, adding an additional stage may produce eight beam portions, and a further stage producing sixteen beam portions.

Referring back to FIG. 2, reformatted beams 136 and 138 are received by image expander 174 producing output beam 156, output beam 156 being made up of sliced beams 158 and 160. Image expander 174 has concave lens 142 which can receive reformatted beams 136 and 138, and can uniformly expand reformatted beams 136 and 138 producing expanding beam 146. Image expander 174 can additionally have collimating lens 148 which receives expanding beam 146 and substantially collimates expanding beam 146, producing output beam 156. In some embodiments, concave lens 142 and collimating lens 148 may be cylindrical lenses which can expand reformatted beams 136 and 138 horizontally, while maintaining their vertical dimension.

Passing output beam 156 through a focusing lens having substantially the same focal length as the collimating lens or curved mirror used to produce input beam 102, focuses output beam 156 to produce an output spot. This output spot can project an image of the input spot generated by passing input beam 102 through the same focusing lens, the output spot being compressed in the horizontal direction by the slicing factor and expanded in the vertical direction by the slicing factor, while maintaining a light intensity that is similar to the light intensity of the input spot generated by input beam 102 passing through the same focusing lens. In the embodiment of optical slicer 100 shown in FIG. 2, the output spot generated by output beam 156 is two times larger in the vertical direction and compressed by two times in the horizontal direction, compared to the input spot generated by passing input beam 102 through the same focusing lens.

With reference to FIGS. 6A-6D, a skilled person would appreciate that the various alternative embodiments of the compressor shown in FIGS. 6A-6D can be used as expanders as well, if such embodiments are implemented with the light beams being projected in the opposite direction as the light beams shown in FIGS. 6A-6D. Additionally, skilled persons will appreciate that other apparatus comprising of optical elements can be implemented and positioned appropriately to produce expanded beam 156.

Figure 3:
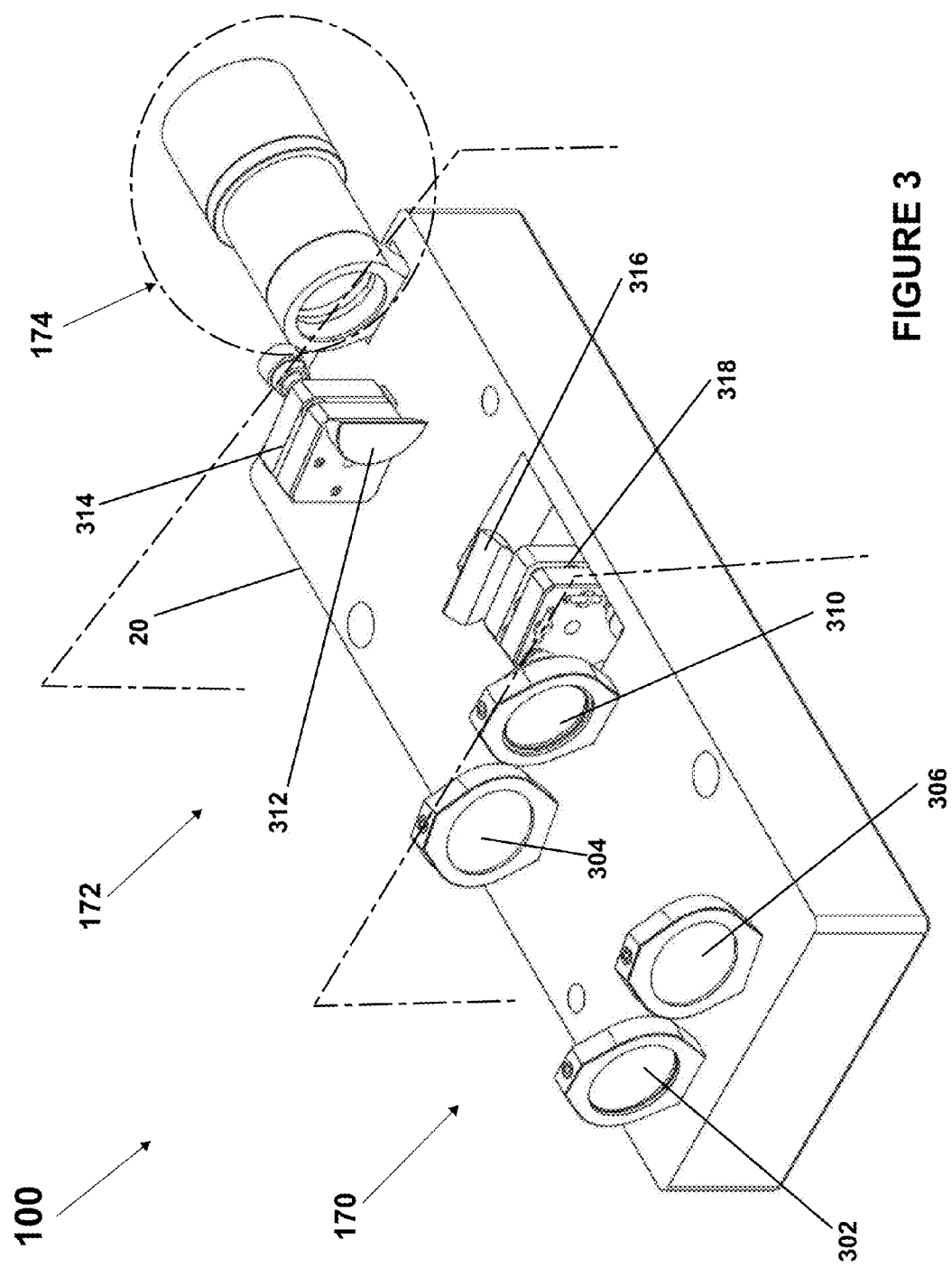
FIG. 3 shows an isometric view of an alternative embodiment of an optical slicer having a slicing factor of two.

With reference to FIG. 3, an embodiment of optical slicer 100 is shown. Optical slicer 100 having image compressor 170, image reformatter 172 and image expander 174. In the embodiment shown in FIG. 3, optical slicer has a slicing factor of two. Image compressor 170, having converging lens 302, reflective surfaces 304 and 306 and collimating lens 310, receives an input beam at converging lens 302, producing a converging beam, being received and reflected by reflective surface 304 to reflective surface 306. The converging beam reflecting off reflective surface 306 where it passes through collimating lens 310, substantially collimating the beam, and directing the collimated beam to image reformatter 172

Image reformatter has reflective surfaces 312 and 316, each of reflective surfaces 312 and 316 being connected to mounting brackets 314 and 318 respectively, for securement to housing 320 of optical slicer 100. Reflective surfaces 312 and 316 can be D-shaped mirrors and reflective surface 312 can be oriented vertically, with the flat edge being the closest edge to the reformatted beam output by reformatter and reflective surface 316 oriented with the curved edge facing downwards.

The compressed beam output from compressor 170 passes by reflective surface 312 and a portion of the compressed beam passes by reflective surface 316, the remaining portion of the compressed beam reflecting off reflective surface 312 back towards reflective surface 316. This first beam portion of the compressed beam passing by both reflective surfaces forming a first portion of the reformatted beam output by image reformatter 172. The remaining portion of the compressed beam reflecting back towards reflective surface 316, and reflecting back and forth between reflective surfaces 316 and 312 each time a portion of the reflected compressed beam passing by reflective surface 312 forming a subsequent beam portion of reformatted beam. The portions of reformatted beam being substantially vertically stacked and substantially parallel, and each representing a sliced portion of the compressed beam.

Image reformatter 172 in the embodiment shown in FIG. 3 forming a reformatted beam made up of two beam portions, the two portions substantially parallel and substantially vertically stacked and each representing a portion of the compressed beam output from image compressor 170. A first portion of the compressed beam reflecting off reflective surface 312 and back towards reflective surface 316, this portion subsequently being reflected off reflective surface 316 and passing by reflective surface 316, resulting in the reformatted beam having two portions. Skilled persons will understand that an increase in the number of back and forth reflections between reflective surfaces 316 and 312 can increased the number of portions of the reformatted beam.

Image expander 174, in the embodiment shown in FIG. 3, receives the reformatted beam from image reformatter 172 and produces an expanded collimated output beam, the expanded collimated output beam being of similar dimensions as the input beam directed into optical slicer 100. Image expander 174, in the embodiment shown in FIG. 3, can be comprised of appropriate lenses and/or mirrors, to expand and collimate reformatted beam appropriately.

The resulting output beam, when passed through a focusing lens having substantially the same focal length as the collimating lens or curved mirror that generated the collimated input beam, focuses the output beam to produce an output spot. This output spot producing an image of the input spot that would be generated if the input beam were passed through the same focusing lens being compressed in the horizontal direction by the slicing factor of optical slicer 100 and expanded in the vertical direction by the slicing factor of optical slicer 100, while maintaining a similar light intensity as the input spot generated by the input beam when passed through the same focusing lens. The output spot generated by the output beam of optical slicer 100 shown in FIG. 3 being two times compressed in the horizontal direction and expanded by two times in the vertical direction, optical slicer 100 shown in FIG. 3 being an optical slicer having a slicing factor of two.

Figure 4:
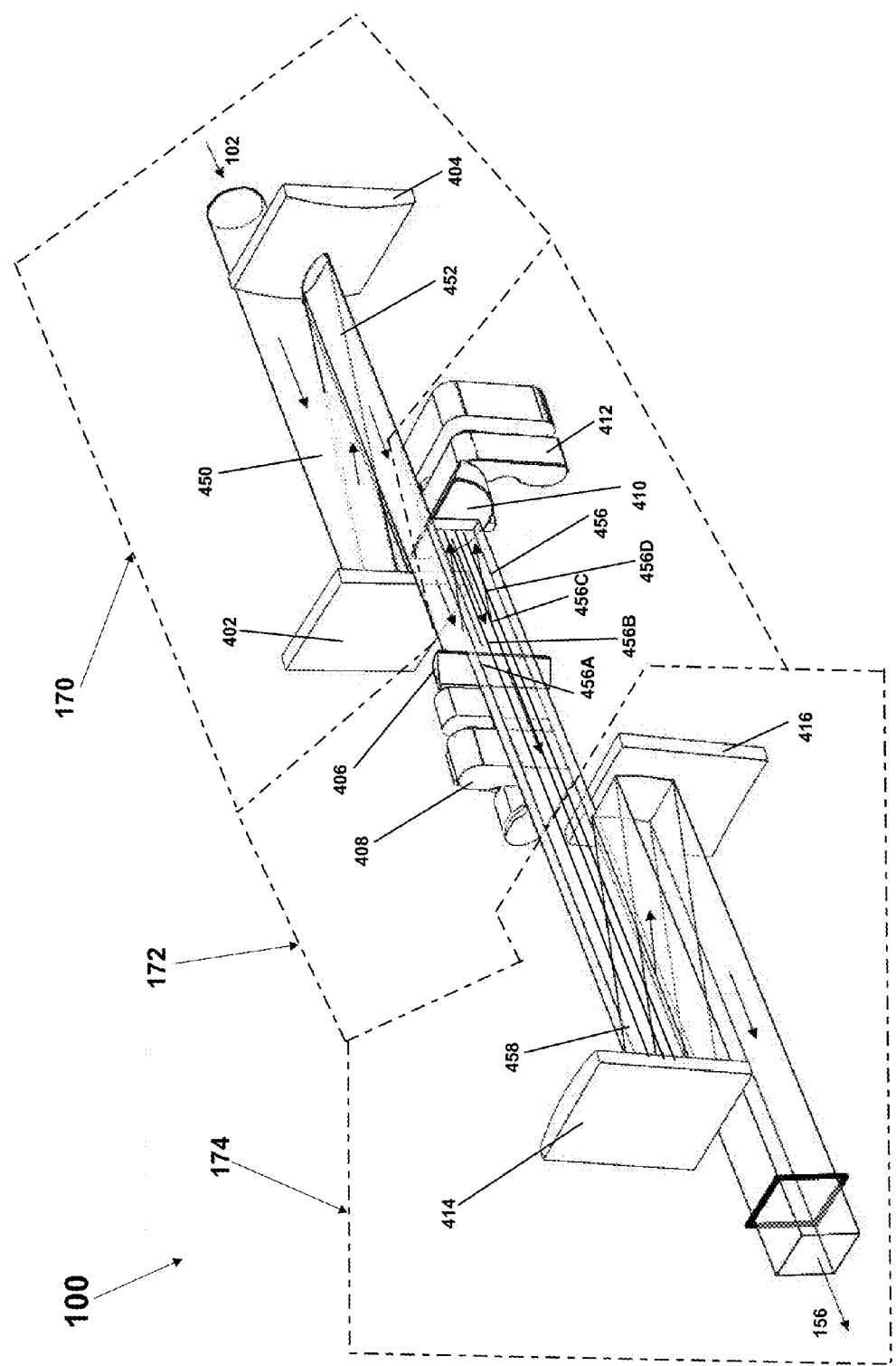
FIG. 4 shows an isometric view of an embodiment of an optical slicer having a slicing factor of four.

With reference to FIG. 4, optical slicer 100 is shown having image compressor 170, image reformatter 172 and image expander 174. In the embodiment shown in FIG. 4, optical slicer 100 has a slicing factor of four. Input beam 102 can be substantially collimated, which can be produced by a collimating lens or a curved mirror.

Input beam 102 is received by image compressor 170 can output compressed beam 452. Image compressor 170 having cylindrical concave mirror 402 which reflects input beam 102 to generate vertically converging beam 450.

Figure 5A:
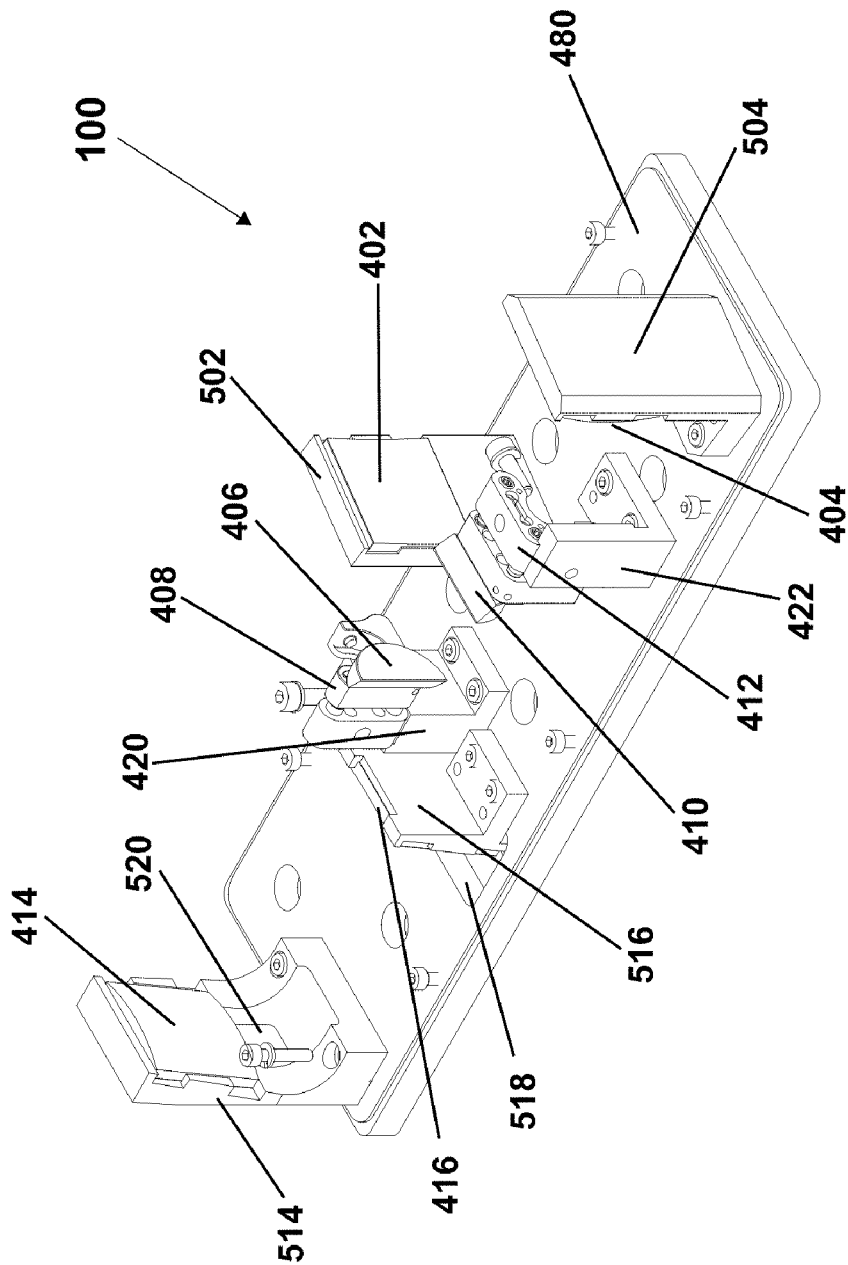
FIG. 5A shows an isometric view of an alternative embodiment of an optical slicer having a slicing factor of four.
Figure 5B:
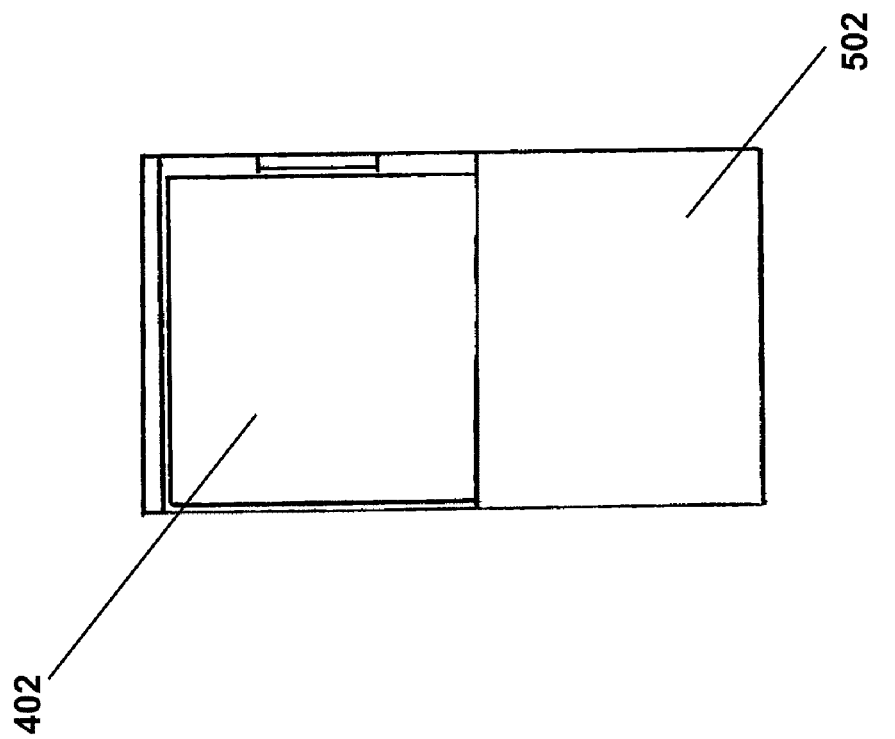
FIGS. 5B-5G shows isometric and plan views of embodiments of optical elements of the optical slicer of FIG. 5A.

With additional reference to FIGS. 5A and 5B, cylindrical concave mirror 402 can be mounted to mounting bracket 502 for securement to base plate 480 of optical slicer 100. In some embodiments, cylindrical concave minor 402 may have a focal length of 103.360 mm and can be positioned at a 7.3 degree tilt horizontally and a 0.0 degree tilt vertically relative to the path of the incoming beam; however skilled persons will understand that other focal lengths and positioning can be used to produce vertically converging beam 450.

Figure 5C:
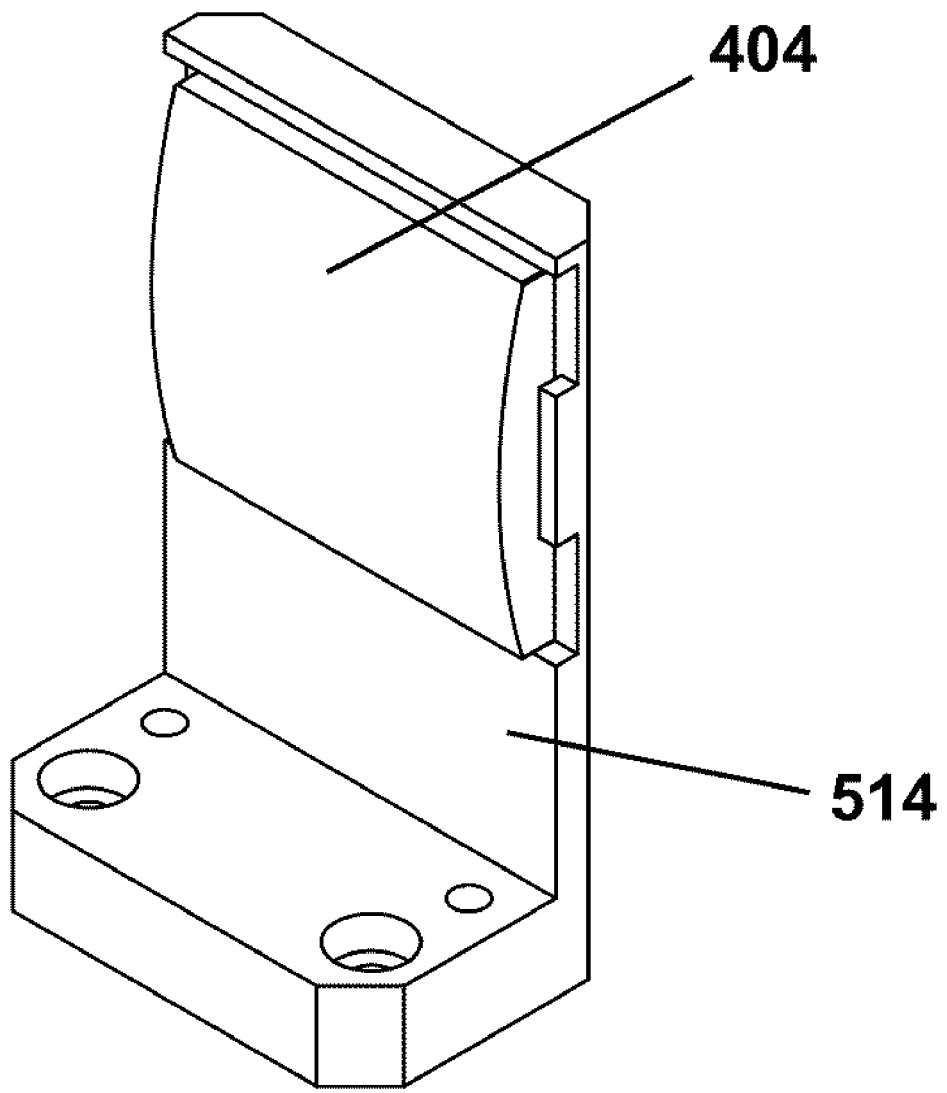

Vertically converging beam 450 may be received by cylindrical convex mirror 404 which collimates vertically converging beam 450 outputting compressed beam 452. With additional reference to FIGS. 5A and 5C, cylindrical convex mirror 404 can be mounted to mounting bracket 504 for securement to base plate 480 of optical slicer 100. In some embodiments, cylindrical convex mirror 404 can have a focal length of −25.84 mm and may be positioned at a 7.3 degree tilt horizontally and a 0.0 degree tilt vertically relative to the path of the incoming beam; however, skilled persons will understand that other focal lengths and positioning can be used to produce compressed beam 452.

In some embodiments, compressed beam 452, if passed through a focusing lens with the same focal length as the collimating lens or curved mirror used to produce input beam 102, produces a compressor spot that is expanded in the vertical direction by the slicing factor and having a similar horizontal dimension when compared to the input spot generated by passing input source 102 through the same focusing lens.

With reference back to FIG. 4, compressed beam 452 is received by image reformatter 172 which outputs reformatted beam 456, reformatted beam 456 being made up of portions 456A, 456B, 456C and 456D each being substantially parallel and substantially vertically stacked, and each being a sliced portion of compressed beam 452.

Figure 5D:
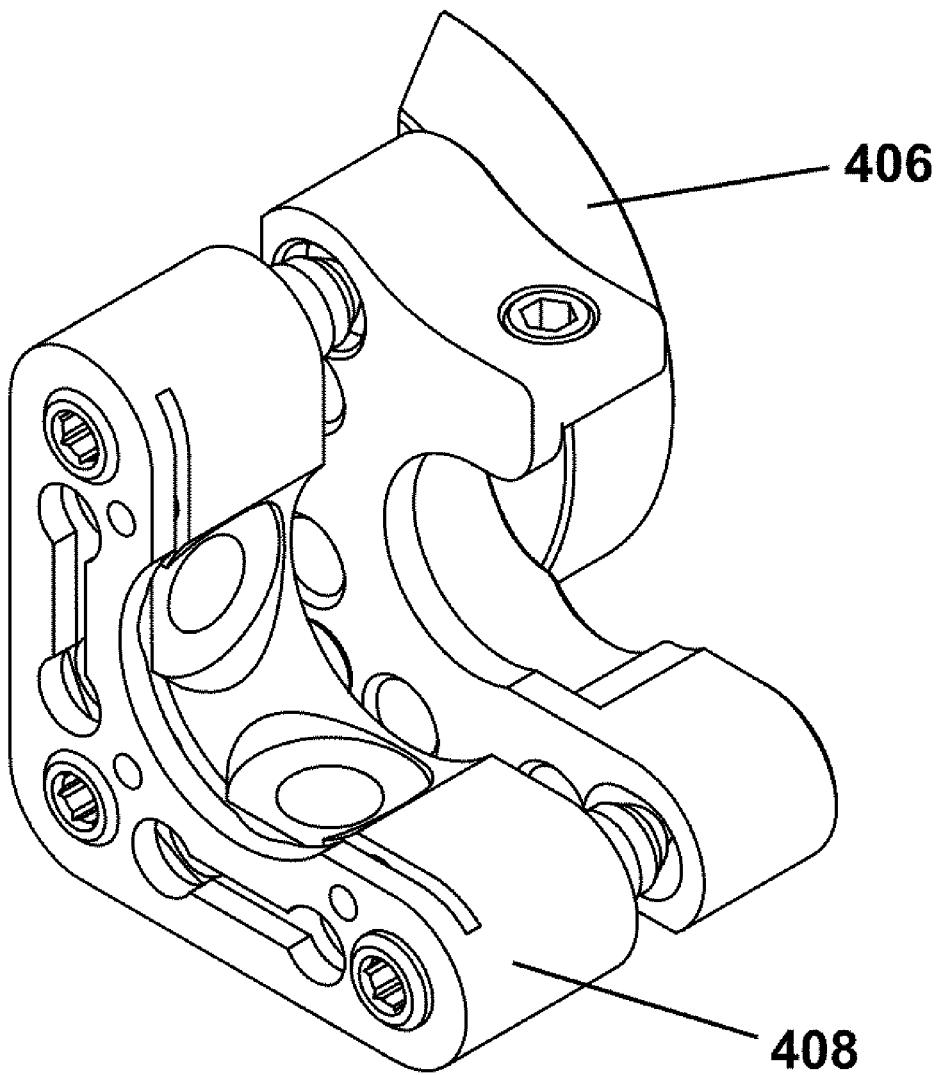
Figure 5E:
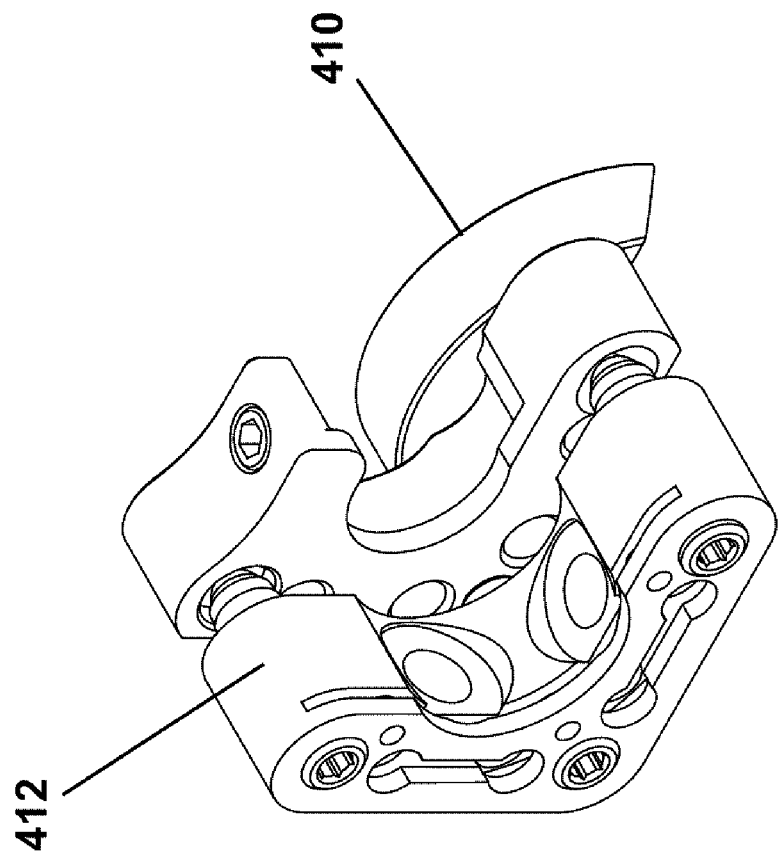

With additional reference to FIGS. 5A, 5D and 5E, image reformatter 172 can have D-shaped mirrors 406 and 410. D-shaped minor 406 can be mounted to mounting bracket 408, and can be secured to bracket 420, bracket 420 secured to base plate 480 of optical slicer 100. D-shaped minor 406 can be vertically oriented with the flat edge being located closest to reformatted beam 456 when in use. D-shaped minor 406 can be positioned at a 2.5 degree tilt horizontally and a 2.7 degree tilt vertically downwards relative to the incoming path of compressed beam 452, when compressed beam 452 first approaches D-shaped mirror 406.

D-shaped mirror 410 can be mounted to mounting bracket 412, which can be secured to bracket 422, bracket 422 being secured to base plate 480 of optical slicer 100. D-shaped minor 410 can be oriented horizontally with the flat edge being located closest to reformatted beam 456 when in use. D-shaped minor 410 can be positioned at a 2.5 degree tilt horizontally and a 2.7 degree tilt vertically upwards relative to the incoming path of compressed beam 452, when compressed beam 452 first approaches D-shaped mirror 406. In some embodiments, D-shaped mirrors 406 and 410 may be Thorlabs™ #BBD1-E02 mirrors. Skilled persons will understand that differently shaped mirrors or other reflective surfaces, including convex or concave shaped surfaces can be used to produce reformatted beam 456, and additionally, alternative positioning of minors or other reflective surfaces may be implements to achieve substantially similar results.

When in use, compressed beam 452 can pass over D-shaped mirror 410 and can reach the position of D-shaped mirror 406. In some embodiments, portion 456A of compressed beam 452 passes by D-shaped mirror 406, while the remaining portion of compressed beam 452 is reflected back and forth between D-shaped mirror 406 and D-shaped mirror 410 until reformatted beam 456, made up of portions 456A, 456B, 456C and 456D is generated. With each reflection back and forth a portion of the reflected beam passes by D-shaped mirror 406 to produce a corresponding portion of reformatted beam 456. For example, after portion 456A has passed by D-shaped minor 406, the remaining portion of compressed beam 452 is reflected off D-shaped mirror 406, generating a first reflected beam directed toward at D-shaped minor 410.

D-shaped mirror 410 reflects the first reflected beam back towards D-shaped minor 406, a portion of this reflection passing by D-shaped mirror 406, generating portion 456B, the remaining portion of this reflection be directed back at D-shaped minor 410. Portion 456B being positioned below portion 456A, and being substantially parallel to portion 456A and substantially vertically stacked.

The remaining portion of the reflection directed at D-shaped minor 406, generating a subsequent reflected portion, directed back to D-shaped minor 410. This subsequent reflected portion contacting D-shaped minor 410 at a position below the contact position of the first reflected portion. This subsequent reflected portion reflecting off D-shaped minor 410 back towards D-shaped minor 406, a portion passing by D-shaped mirror 406, generating portion 456C, the remaining portion of the reflected beam contacting D-shaped mirror 406. Portion 456C being positioned below portion 456B, each of portions 456A, 456B and 456C being substantially parallel and substantially vertically stacked.

Again, the remaining portion of the reflection is directed at D-shaped mirror 406, generating a further reflected portion, directed back to D-shaped mirror 410. This further reflected portion contacts D-shaped mirror 410 at a position below the contact position of the previous reflected portion. This further reflected portion reflects off D-shaped mirror 410 and passes by D-shaped mirror 406, generating portion 456D. Portion 456D is positioned below portion 456C, each of portions 456A, 456B, 456C and 456D being substantially parallel and substantially vertically stacked and each being a sliced portion of compressed beam 452.

While the embodiment shown in FIG. 4 is an optical slicer that generates four beam portions, a person of skill will understand that an increase in the number of back and forth reflections between D-shaped mirrors 406 and 410 can increased the number of portions of reformatted beam 456. Skilled persons will appreciate that the focal lengths and sizes of mirrors 402, 404, 414 and 416 may be adjusted appropriately to accommodate such modifications.

Referring back to FIG. 4, if reformatted beam 456 is passed through a focusing lens with the same focal length as the collimating lens or curved mirror used to produce input beam 102, a reformatter spot is produced. The produced reformatter spot producing an image of input beam 102, that is expanded in the vertical dimension by the slicing factor and has a similar horizontal dimension as compared to the input spot generated by passing input beam 102 through the same focusing lens, while maintaining a similar light intensity as the input spot.

Reformatting beam 456 may be received by image expander 174, producing output beam 156. Image expander 174 having cylindrical convex mirror 414 and cylindrical concave mirror 416. Cylindrical convex mirror 414 receiving and reflecting reformatted beam 456, producing horizontally diverging reformatted beam 458 directed at cylindrical concave mirror 416. Cylindrical concave mirror 416 receiving horizontally diverging reformatted beam 458 and substantially collimating horizontally diverging reformatted beam 458, producing output beam 156. With additional reference to FIG. 5A, output beam 156 passes through output aperture 520, which can be located below cylindrical convex mirror 414 and through mounting bracket 514.

The resulting output beam 156, if passed through a focusing lens having substantially the same focal length as the collimating lens or curved mirror that generated the input beam 102, focuses output beam 156 to produce an output spot. This output spot producing an image of the input spot that would be generated if input beam 102 is passed through the same focusing lens but being compressed in the horizontal direction by the slicing factor of optical slicer 100 and expanded in the vertical direction by the slicing factor of optical slicer 100, while maintaining a similar light intensity as the input spot.

Figure 5F:
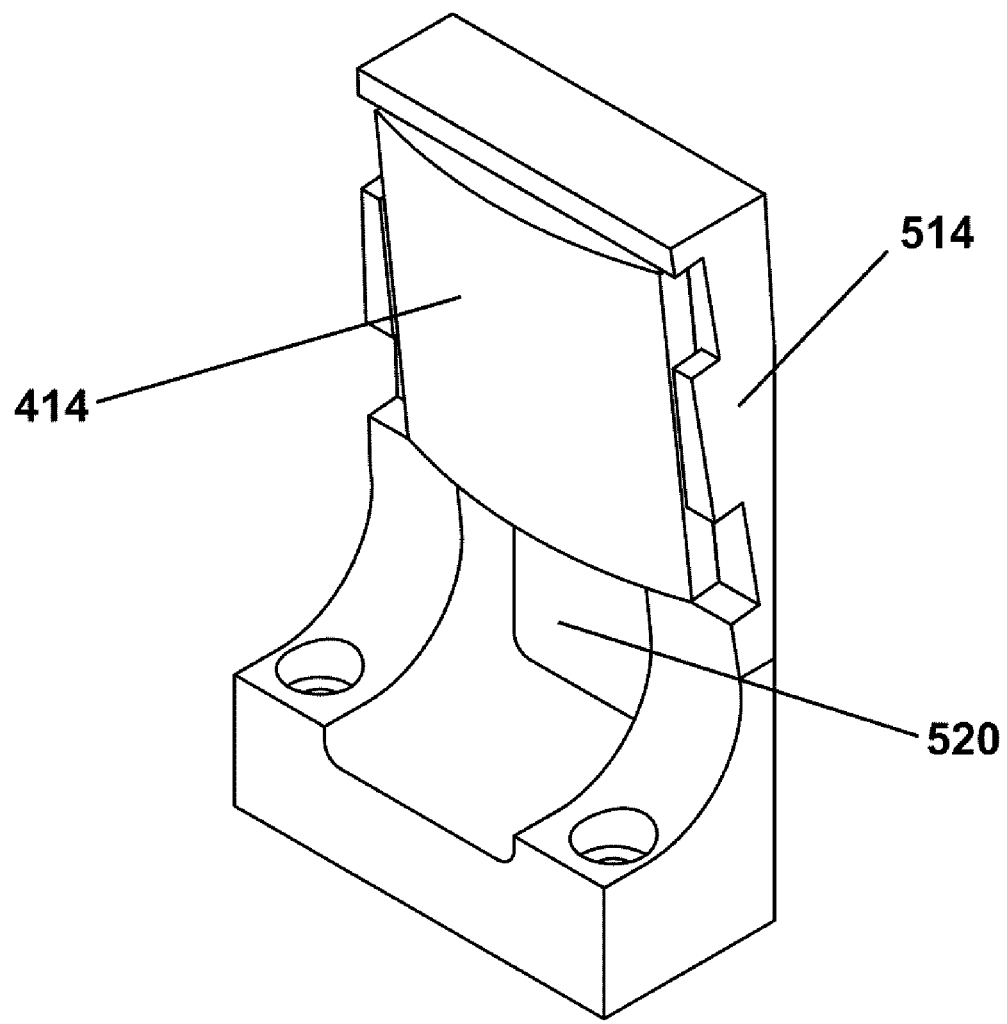

With additional reference to FIGS. 5A and 5F, cylindrical convex mirror 414 can be secured to mounting bracket 514 for securement to base plate 480 of optical slicer 100. In some embodiments, mounting bracket 514 can have output aperture 520 located therethrough, where in some embodiments output aperture 520 can be located below the position of cylindrical convex mirror 414 when secured to mounting bracket 514. In some embodiments, cylindrical convex mirror 414 may have a focal length of −25.84 mm and may be positioned at a 0.0 degree tilt horizontally and a 6.3 degree tilt vertically downwards relative to the path of the incoming beam; however, skilled persons will understand that other focal lengths and positioning can be used to produce horizontally diverging reformatted beam 458.

Figure 5G:
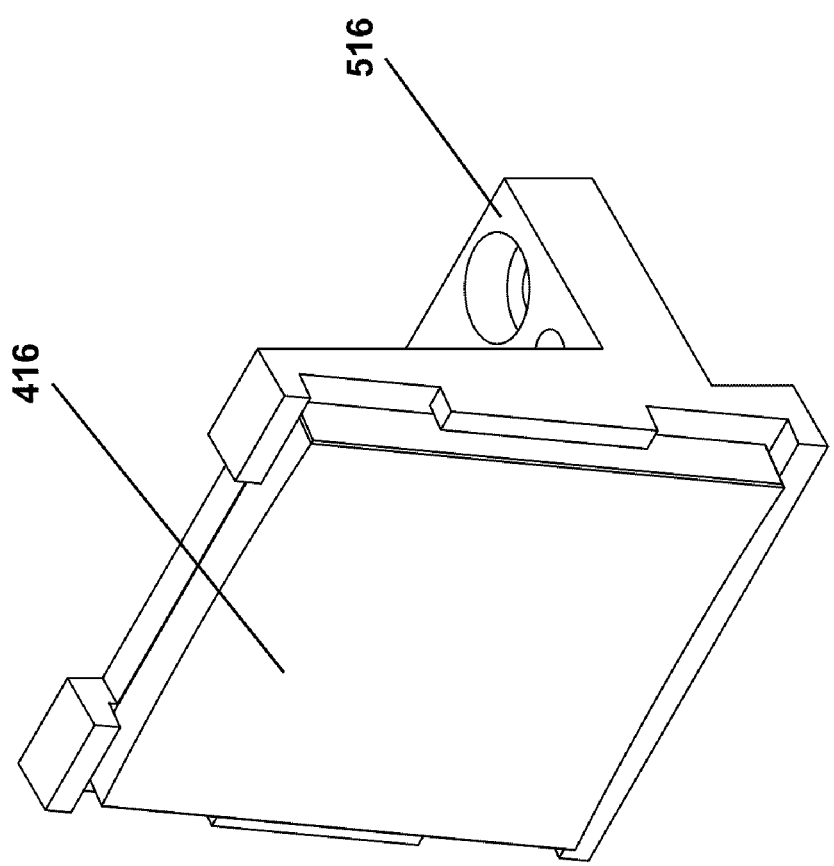

With additional reference to FIGS. 5A and 5G, cylindrical concave mirror 416 can be mounted to mounting bracket 516 for securement to base plate 480 of optical slicer 100. In some embodiments, base plate 480 having an indent therein which can receive a portion of mounting bracket 516 to provide that a portion of concave mirror 416 can rest below a top surface of base plate 480. In some embodiments, cylindrical concave mirror 416 can have a focal length of 103.360 mm and can be positioned at a 0.0 degree tilt horizontally and a 6.3 degree tilt vertically upwards relative to the path of the incoming beam; however, skilled persons will understand that other focal lengths and positioning can be used to produce output beam 156.

Figure 5H:
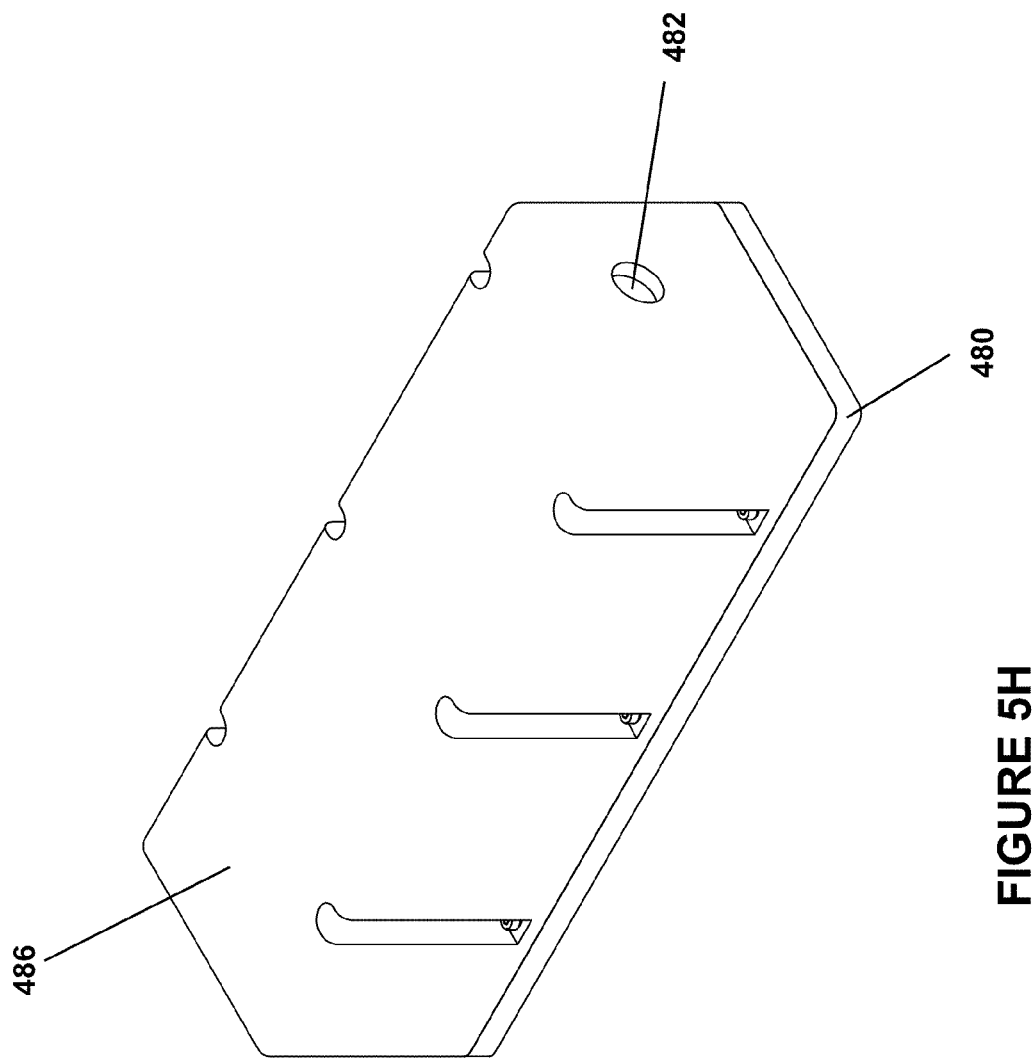
FIGS. 5H-5I shows an isometric view of an embodiment of a housing cover for the optical slicer shown in FIG. 5A.
Figure 5I:
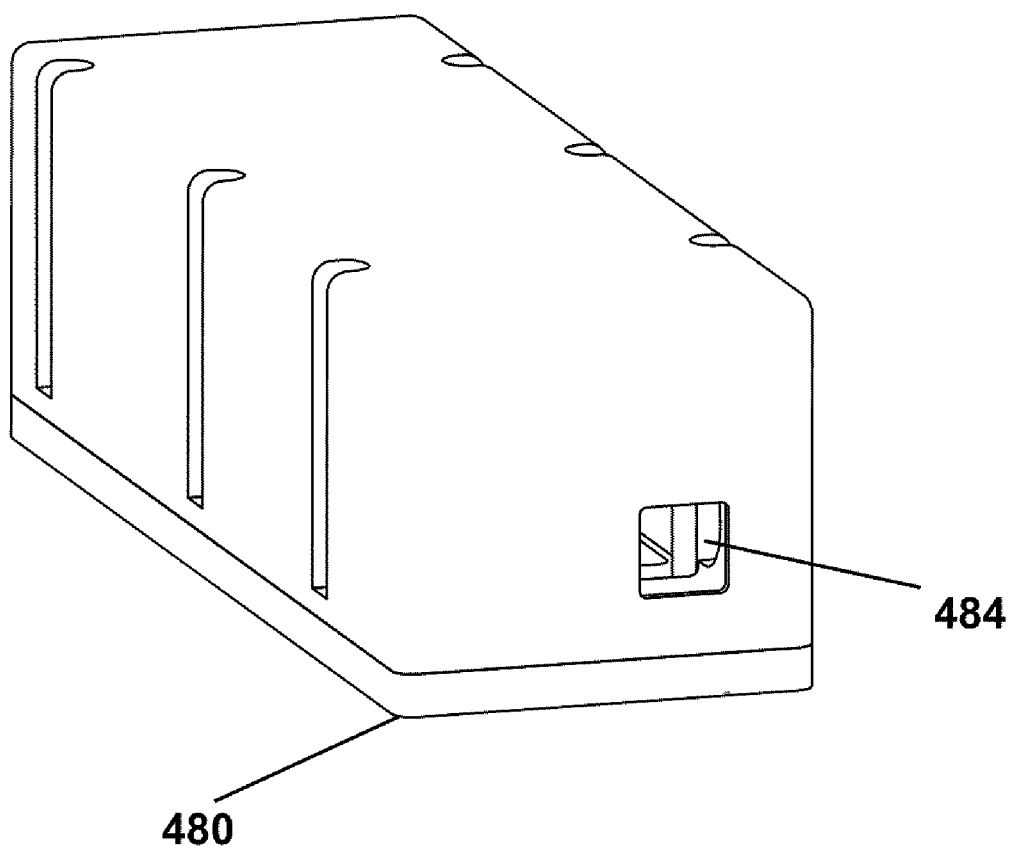

With reference to FIG. 5H, optical slicer 100 can be covered by housing cover 486 secured to base plate 480 to protect the interior elements of optical slicer 100, for example from dust and other particulates. Housing cover 486 can have input aperture 482 for receiving the input beam and can additionally have output aperture 484 for outputting the output beam from optical slicer 100.

In some embodiments of the optical slicer described herein, a second optical slicer may be placed in series wherein output beam 156 from a first optical slicer may be input beam 102 into a second optical slicer. In such embodiments it has been found that the slicing factor may be multiplicative; for example, combining two slicers having a slicing factor of four in series may tend to result in an overall slicing factor of sixteen.

While the present invention can be used with any device that tends to use light as an input, one example of the use of the optical slicer described herein may be in the field of spectroscopy. A general spectrometer is a device that disperses light such that the intensity value of light as a function of wavelength can be recorded on a detector. For readings that require a higher spectral resolution, a narrower slit is needed in a direct relationship to spectral resolution and typically, a narrow slit will provide a reduction in the light intensity received by the general spectrometer device. Positioning an optical slicer in front of the input of a general spectrometer device can tend to produce an input into the general spectrometer device slit having an increased light intensity value as compared to a slit without an optical slicer, by the factor of the slicing factor, over the area of the slit, tending to provide increased spectral resolution without sacrificing light signal intensity.

A subset of spectroscopy is interferometric spectroscopy; the defining feature of interferometric spectrometers is that the dispersing element used is not a grating or a prism. Rather, the dispersion is achieved another way, such as by taking the Fourier transform of the pattern generated by two interfering beams. The slicer not only increases brightness of the output, but also allows large improvements in the contrast of the interference fringes, as well as signal-to-noise ratio.

An optical slicer can be used in a subset of OCT called Fourier domain OCT (FD-OCT), and more specifically in a specific implementation FD-OCT called Spectral Domain OCT (SD-OCT). An SD-OCT instrument is an interferometric spectrometer with a dispersive spectrometer to record the signal. An optical slicer can be included at the input to the dispersive spectrometer right before the dispersive beam element in a collimated beam path.

A further subset of interferometric spectrometry as pertains to medical imaging is Optical Coherence Tomography (OCT), a technique that uses an interferometric spectrometer to make an image. A slicer will improve the throughput, as well as the fringe contrast, of the OCT device; the result is that the slicer can improve the depth penetration possible with OCT systems, speeding imaging time and increasing the value of the captured image. An optical slicer can be included at the input to the OCT device.

A further application of the slicer is in the field of miniature spectroscopy, particularly as it pertains to Raman spectroscopy. Current Raman spectrometers have been implemented that are miniaturized to handheld scale. As the slicer can be used to increase throughput in any system wherein light is used as the input source, a miniaturized embodiment of the slicer can be used in conjunction with miniaturized spectrometers, like the Raman, to increase spectral resolution, increase output signal strength, and decrease scan time. An optical slicer can be included at the input to the Raman spectroscopy device.

The present invention has been described with regard to specific embodiments. However, it will be obvious to persons skilled in the art that a number of variants and modifications can be made without departing from the scope of the invention as described herein.

What is claimed is:

1. An optical slicer for generating an output spot comprising:
    a beam compressor which receives a substantially collimated input beam and compresses the beam;
    a beam reformatter which receives the compressed beam to reformat the beam into a plurality of sliced portions of the compressed beam and vertically stacks the portions substantially parallel to each other; and
    a beam expander which expands the reformatted beam to produce a collimated output beam for producing the output spot that is expanded in a first dimension and compressed in a second dimension relative to an input spot produced from the input beam.

2. The optical slicer of claim 1, wherein the compressed beam is compressed vertically and is substantially similar horizontally relative to the input beam.

3. The optical slicer of claim 2, wherein the output beam is expanded horizontally relative to the reformatted beam and has substantially similar dimensions to the input beam.

4. The optical slicer of claim 3, wherein the number of sliced portions of the compressed beam is equal to a slicing factor, n.

5. The optical slicer of claim 4, wherein the output spot is expanded vertically by the factor n and compressed horizontally by the factor n.

6. The optical slicer of claim 3, wherein the beam compressor comprises a convex lens and a concave lens, wherein the convex lens receives the input beam and produces a converging beam and the compressed beam is formed by the converging beam passing through the concave lens.

7. The optical slicer of claim 3, wherein the beam compressor comprises a concave reflective surface and a convex reflective surface, wherein the concave reflective surface receives the input beam and produces a converging beam and the compressed beam is formed by the converging beam reflecting off the convex reflective surface.

8. The optical slicer of claim 3, wherein the beam reformatter comprises at least two reflective surfaces, wherein one of the reflective surfaces receives a portion of the compressed beam and reflects the portion for at least one reflection back and forth between the at least two reflective surfaces, and wherein each of the sliced portions is formed by a second portion of compressed beam passing by the at least two reflective surfaces after each of the at least one reflection.

9. The optical slicer of claim 3, wherein the beam expander comprises a concave lens and a convex lens, and wherein the concave lens receives the reformatted beam and produces a diverging beam and the output beam is produced by the diverging beam passing through the convex lens.

10. The optical slicer of claim 3, wherein the beam expander comprises a convex reflective surface and a concave reflective surface, and wherein the convex reflective surface receives the reformatted beam and produces a diverging beam and the output beam is formed by the diverging beam reflecting off the concave reflective surface.

11. The optical slicer of claim 3, where the output spot has a light intensity substantially the same as the light intensity of the input spot.

12. A spectrometer comprising the optical slicer of any of claims 1 to 11, wherein the slicer is positioned upstream of the optical input slit of the spectrometer to direct the output spot therethrough.

13. A method of generating an output spot comprising:
    compressing a collimated input beam;
    reformatting the compressed beam into a plurality of sliced portions substantially vertically stacked and substantially parallel to each other; and
    expanding the reformatted beam to produce a collimated output beam for producing an output spot that is expanded in a first dimension and compressed in a second dimension relative to an input spot produced from the input beam.

14. The method of claim 13, wherein the compressed beam is compressed vertically and is substantially similar horizontally relative to the input beam.

15. The method of claim 14, wherein the output beam is expanded horizontally relative to the reformatted beam and has substantially similar dimensions to the input beam.

16. The method of claim 15, wherein the number of sliced portions is equal to a slicing factor, n.

17. The method of claim 16, wherein the output spot is expanded vertically and compressed horizontally by the factor n.

* * * * *